United States Patent [19]

Ho

[11] Patent Number: 4,751,363
[45] Date of Patent: Jun. 14, 1988

[54] AUTOMATIC TURN-ON FINE FINISH CIRCUIT FOR ELECTRICAL DISCHARGE MACHINING

[76] Inventor: Kuang-Ta Ho, 7202 Quail Meadow La., Charlotte, N.C. 28210

[21] Appl. No.: 834,378
[22] Filed: Feb. 28, 1986
[51] Int. Cl.[4] .............................................. B23H 1/02
[52] U.S. Cl. .................................. 219/69 P; 219/69 C
[58] Field of Search .................... 219/69 C, 69 P, 69 S

[56] References Cited

U.S. PATENT DOCUMENTS

| | | | |
|---|---|---|---|
| 3,697,879 | 10/1972 | Holliday | 219/69 C |
| 3,805,012 | 4/1974 | Bell, Jr. et al. | 219/69 P |
| 3,809,848 | 5/1974 | Bell, Jr. | 219/69 C |
| 3,812,317 | 5/1974 | De Bont et al. | 219/69 P |
| 4,236,057 | 11/1980 | Inoue | 219/69 P |
| 4,306,135 | 12/1981 | Bell, Jr. et al. | 219/69 P |
| 4,347,425 | 8/1982 | Obara | 219/69 P |
| 4,392,043 | 7/1983 | Inoue | 219/69 P |
| 4,450,337 | 5/1984 | Inoue | 219/69 P |
| 4,504,722 | 3/1985 | Kishi et al. | 219/69 P |
| 4,598,190 | 7/1986 | Balleys | 219/69 C |
| 4,614,854 | 9/1986 | Obara et al. | 219/69 P |
| 4,654,497 | 3/1987 | Obara | 219/69 C |

FOREIGN PATENT DOCUMENTS

| | | | |
|---|---|---|---|
| 55-48533 | 4/1980 | Japan | 219/69 C |
| 163836 | 12/1981 | Japan | 219/69 P |
| 201132 | 12/1982 | Japan | 219/69 C |
| 59-93227 | 5/1984 | Japan | 219/69 C |
| 156618 | 9/1984 | Japan | 219/69 C |
| 8304204 | 12/1983 | World Int. Prop. O. | 219/69 C |

*Primary Examiner*—A. D. Pellinen
*Assistant Examiner*—Geoffrey S. Evans
*Attorney, Agent, or Firm*—Neuman, Williams, Anderson & Olson

[57] ABSTRACT

The EDM power supply includes a normally operative roughing circuit and a finishing circuit which is switched into the power supply at an appropriate time. The time of switching is set by a detecting circuit which determines whether or not the machining pulse on time is equal or less than two microseconds or other predetermined time periods. Because the pulse on time for finishing is generally within the time range preselected, the following circuit is then enabled.

8 Claims, 1 Drawing Sheet

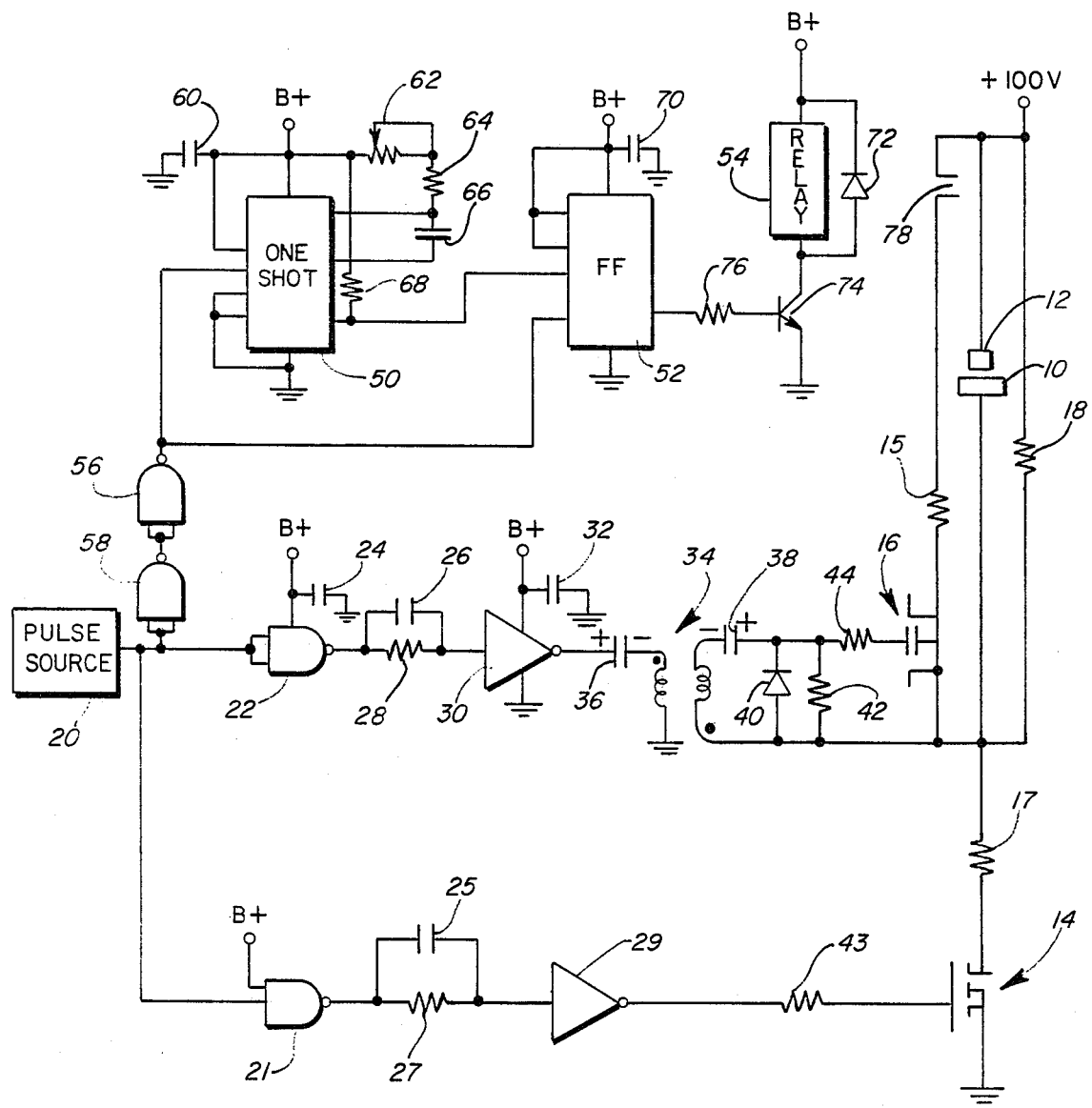

AUTOMATIC TURN-ON FINE FINISH CIRCUIT FOR ELECTRICAL DISCHARGE MACHINING

BACKGROUND ART

The present invention relates to a combined roughing and finishing circuit in which the finishing circuit is enabled when the machining pulse "on" time has been shortened to a point that requires fine finishing. In electrical discharge machining, there is provided a tool electrode and an electrically conductive workpiece which are separated by a dielectric filled gap. A main power supply and an electronic switch are connected by turning the electronic switch on and off with predetermined on and off times thus passing erosive electrical discharges across the gap. It has been found that a servo means must be included to provide relative movement between the electrode and workpiece as material is being removed. Because of stray capacitance in the power lead cable, the voltage at the electrode cannot drop to zero immediately after the electronic switch is turned off. This situation is accentuated during the fine finish operation in which relatively short on and off times are used. In order to improve the surface finish in a finishing operation, it is necessary to lower the machining energy in each pulse by altering the voltage waveform. Reference is made to, U.S. Pat. Application No. 834,375 filed on 02/28/86 for "FINE FINISH CIRCUIT FOR ELECTRICAL DISCHARGE MACHINING APPARATUS" of common ownership with the present application.

The present invention relates to a fine finish circuit that may be connected in the circuit across the gap at the appropriate time as the finishing operation is being undertaken. The finishing circuit includes an electronic switch operably connected across the EDM gap at an appropriate time in the machining operation. When the main electronic switch is triggered on a pulse occurrs across the gap and the second electronic switch is then triggered on to cause an abrupt drop in gap voltage and an off time and therefor diminishing the current in the gap during the finishing operation. The present invention includes a system for determining the appropriate time for the enabling of the finishing circuit.

BRIEF DESCRIPTION OF THE DRAWING

The present invention will now be described with respect to the accompanying specification and the drawing which is a combined schematic and block diagrammitic showing of the electrical discharge machining circuit.

BEST MODE OF CARRYING OUT THE INVENTION

The drawing shows the basic EDM circuit connected to the EDM gap including a workpiece 10 and a tool electrode 12. A transistor switch in the form of a HEXFET 14 is connected with a limit resistor 17 to the EDM gap. A DC power supply of the order of 100 volts is connected in series with the electrode 12. A shunt resistor 18 is also connected across the machining gap. A second transistor in the form of a HEXFET 16 is connected across the EDM gap through a resistor 15.

The triggering circuit for the gap electronic switches includes a drive pulse source 20 at the left hand end of the drawing. The drive pulses are passed through an inverter 21 and then through a resistor - capacitor network that includes the capacitor 25 and a resistor 27. The drive pulse then goes to the input of a driver 29. A resistor 43 is connected between the output of the driver 29 and the gate of the HEXFET 14. The drive pulse is also passed to an inverter 22. Inverter 22 includes a capacitor 24 used as an external bypass network. The pulses are then passed through a resistor - capacitor network which includes capacitor 26 and a resistor 28 and then to the input terminal of a driver 30. The driver 30 includes a capacitor 32 used as an external bypass network as shown. A pulse transformer 34 is connected in circuit with a capacitor 36. A DC restored network is connected including a capacitor 38, a diode 40 and a resistor 42. A resistor 44 is serially connected to the triggering gate of the HEXFET 16. The secondary winding of the pulse transformer 34 is connected in such a way that the waveform output to the gate of the HEXFET 16. As a result of the turn on of the HEXFET 14 and turn off of the HEXFET 16, the pulse is initiated across the EDM gap. The HEXFET 16 accordingly is operated and will turn on during the off times of HEXFET 14. Actually, there is provided a short across the gap through the resistor 15 during the off time as a result of the turn on of the HEXFET 16.

In a roughing power supply, one or more HEXFETS such as HEXFET 14 would be incorporated in the circuit. With the addition of the network including the second HEXFET 16, the voltage waveform will be a square wave for each pulse and this will result in a finer and a more uniform fine finish. It is necessary to initiate the operation of the fine finish circuit at an appropriate time in the EDM machining cycle. Enabling of the fine finish circuit is controlled by the upper network shown in the drawing that includes a one-shot multivibrator 50, a flip flop 52 and a relay 54. The one-shot 50 is connected through a pair of inverters 56 and 58 to the drive pulse source 20. The one-shot 50 includes in its external circuit a bypass capacitor 60, a plus bias source and a variable RC time network including a potentiometer 62, a resistor 64 and a separate capcitor 66. Resistor 68 is an output resistor. The next following flip-flop 52 stage includes a B+bias source and a bypass capacitor 70. Enabling of the fine finish including the HEXFET 16 is controlled by the relay 54 having a shunt diode 72 and further having a transistor 74 connected to actuate the relay coil. The base of the transistor 74 is connected to the output of the flip-flop 52 by a resistor 76. The coil of the relay 54 operatively controls the closure of a normally open relay contact 78 which is connected in the lead from the gap to the HEXFET 16. The purpose of the one-shot 50 is to provide a pulse of 2.5 microseconds. The flip-flop will look at the drive pulse after the 2.5 microseconds and provides a high or low output. If the drive signal is high, that means that the pulse on time is more than two microseconds in length. If it is low, that means that the on time is less than two microseconds. This provides a reference point and if the on time is less than two microseconds or equal to two microseconds, it will automatically turn on the fine finish circuit. This is achieved by triggering the transistor 74 and actuating the relay 54 to close the relay contact 78 in the power supply circuit.

The on time selection is of a preselected value such as two microseconds because it is usually this on time range at which the fine finish cut must be incorporated.

It will thus be seen that we have provided by our invention an improved fine finish circuit and a system for automatically turning it on during the machining cycle.

I claim:

1. In an electrical discharge machining apparatus for passing machining power pulses across a machining gap, a power supply including a finishing circuit and a roughing circuit, a system for enabling the finishing circuit, comprising:

means for detecting working machining power pulse ontimes below a predetermined length representative of finish machining; and means operably connected to the detecting means and responsive to operation of the detecting means for connecting the finishing circuit in circuit with said machining gap;

said finishing circuit including an electronic switch connectable across the gap; said roughing circuit including an electronic switch having its principal electrodes connected between the gap and ground; and both said electronic switches operated during finish mechining.

2. The combination as set forth in claim 1 in which said detecting means includes a one-shot multivibrator operably connected to the drive pulse source for said electronic switch.

3. The combination as set forth in claim 1 in which said connecting means includes a relay.

4. The combination as set forth in claim 3 in which said switches comprise HEXFETS.

5. The combination as set forth in claim 3 in which a shunt resistor is connected across the machining gap.

6. The combination as set forth in claim 1 in which said predetermined length is of the order of 2.5 microseconds.

7. The combination as set forth in claim 1 in which said connecting means includes a flip-flop and a relay, said relay having its normally open contacts connected intermediate said gap and said finishing circuit.

8. The combination as set forth in claim 7 in which a drive transistor is connected between said flip-flop and said relay for triggering it into operation.

* * * * *